(12) United States Patent
Yoo et al.

(10) Patent No.: US 7,649,609 B2
(45) Date of Patent: Jan. 19, 2010

(54) METHOD OF FABRICATING AND REPAIRING A SHORT DEFECT IN LCD DEVICE HAVING A RESIDUE PATTERN OF A PREDETERMINED LINE WIDTH REMOVED AFTER FORMING PHOTO-RESIST PATTERN THROUGH REAR EXPOSURE

(75) Inventors: Soon Sung Yoo, Gyenoggi-do (KR); Heung Lyul Cho, Gyenoggi-do (KR)

(73) Assignee: LG Display Co., Ltd., Seoul (KR)

( * ) Notice: Subject to any disclaimer, the term of this patent is extended or adjusted under 35 U.S.C. 154(b) by 601 days.

(21) Appl. No.: 11/445,193

(22) Filed: Jun. 2, 2006

(65) Prior Publication Data
US 2007/0000431 A1    Jan. 4, 2007

(30) Foreign Application Priority Data
Jun. 30, 2005  (KR) .................... 10-2005-0058627

(51) Int. Cl.
*G02F 1/13* (2006.01)
(52) U.S. Cl. ........................................ 349/192; 349/54
(58) Field of Classification Search ................. 349/54, 349/55, 192
See application file for complete search history.

(56) References Cited

U.S. PATENT DOCUMENTS

| | | | | |
|---|---|---|---|---|
| 5,162,933 | A | 11/1992 | Kakuda et al. | 359/59 |
| 5,317,433 | A | 5/1994 | Miyawaki et al. | 359/59 |
| 5,339,181 | A | 8/1994 | Kim et al. | 359/59 |
| 5,462,887 | A | 10/1995 | Glück | 437/48 |
| 5,668,379 | A | 9/1997 | Ono et al. | 257/59 |
| 5,731,856 | A | 3/1998 | Kim et al. | 349/43 |
| 5,771,083 | A | 6/1998 | Fujihara et al. | 349/147 |
| 5,793,460 | A | 8/1998 | Yang | 349/148 |
| 5,847,781 | A | 12/1998 | Ono et al. | 349/44 |
| 5,963,279 | A * | 10/1999 | Taguchi | 349/54 |
| 6,778,233 | B2 * | 8/2004 | Matsuura et al. | 349/54 |

\* cited by examiner

*Primary Examiner*—John Heyman
(74) *Attorney, Agent, or Firm*—Morgan Lewis & Bockius LLP

(57) ABSTRACT

A method for repairing a short defect according to the present invention includes forming a first conductive pattern on a substrate, forming a photo-resist pattern on the first conductive pattern using a rear exposure for the first conductive pattern being shorted by a residue pattern, and removing the residue pattern exposed through the photo-resist pattern.

5 Claims, 16 Drawing Sheets

METHOD OF FABRICATING AND REPAIRING A SHORT DEFECT IN LCD DEVICE HAVING A RESIDUE PATTERN OF A PREDETERMINED LINE WIDTH REMOVED AFTER FORMING PHOTO-RESIST PATTERN THROUGH REAR EXPOSURE

The present invention claims the benefit of Korean Patent Application No. P2005-0058627, filed in Korea on Jun. 30, 2005, which is hereby incorporated by reference.

BACKGROUND OF THE INVENTION

1. Field of the Invention

The present invention relates to a method for repairing a short defect in a liquid crystal display device, and a fabricating method for the liquid crystal display device.

2. Discussion of the Related Art

A liquid crystal display device controls the light transmittance of liquid crystal having dielectric anisotropy through an electric field, thereby displaying a picture. The liquid crystal display device includes a liquid crystal display panel which displays a picture through a liquid crystal cell matrix, and a drive circuit for driving the liquid crystal display panel.

FIG. 1 is a perspective view of a liquid crystal display panel structure according to the related art. As shown in FIG. 1, a liquid crystal panel may include a color filter substrate 10, a thin film transistor substrate 20, and a liquid crystal 24 in between the substrates. The color filter substrate 10 includes a black matrix 4, a color filter 6, and a common electrode 8 which are sequentially formed on an upper glass substrate 2. The black matrix 4 is formed in a matrix shape on the upper glass substrate 2, and the black matrix 4 divides an area of the upper glass substrate 2 into a plurality of cell areas where the color filter 6 is formed, and prevents external light reflection and light interference between adjacent cells. The color filter 6 is divided into red R, green G and blue B in the cell area divided by the black matrix 4. The common electrode 8 is made from a transparent conductive layer spread on the entire surface of the color filter 6 and supplies a common voltage $V_{com}$ when driving liquid crystal 24. Furthermore, an overcoat layer (not shown) is formed between the color filter 6 and the common electrode 8 in order to level the color filter 6.

In FIG. 1, the thin film transistor substrate 20 includes a pixel electrode 22 and a thin film transistor 18 formed at each cell area. The cell area is defined by the crossing of a gate line 14 and a data line 16 on a lower glass substrate 12. The thin film transistor 18 supplies a data signal from the data line 16 to the pixel electrode 22 in response to a gate signal from the gate line 14. The pixel electrode 22 may include a transparent conductive layer that supplies the data signal from the thin film transistor 18 to drive the liquid crystal 24.

In addition, FIG. 1 includes the liquid crystal 24 having a dielectric anisotropy which rotates to control the light transmittance in accordance with the electric field formed by a common voltage $V_{com}$ of the common electrode 8 and the data signal of the pixel electrode 22, thereby reaching gray level status. Furthermore, the liquid crystal display panel may include an alignment film for initially aligning the liquid crystal 24. A spacer (not shown) uniformly maintains a cell gap between the color filter substrate 10 and the thin film transistor substrate 20. Although not shown in FIG. 1, the color filter substrate 10 and the thin film transistor 20 of the liquid crystal display panel are formed by a plurality of mask processes. One mask process includes a plurality of processes, such as a thin film depositing (coating) process, a cleaning process, a photolithography process, an etching process, a stripping process, and an inspection process. However, impurities in the mask process may generate a pattern defect. For example, in the mask process of forming the gate line and the common line together which are adjacent to each other on the substrate, remaining impurities may generate a pattern defect thereby causing the gate line and the common line to be shorted, i.e., to have a short defect.

SUMMARY OF THE INVENTION

Accordingly, the present invention is directed to a short defect repairing method that repairs a short defect in the liquid crystal display, and a fabricating method for the liquid crystal display device.

An object of the present invention is to provide a method of repairing a short defect which may include: forming a first conductive pattern on a substrate; forming a photo-resist pattern on the first conductive pattern using a rear exposure when the first conductive pattern is shorted by a residue pattern; and removing the residue pattern exposed through the photo-resist pattern. In another aspect of the present invention, a method of fabricating a liquid crystal display device may include forming a gate line and a common line on a substrate; forming a photo-resist pattern on the gate line and the common line using a rear exposure when the gate line and the common line are shorted by a residue pattern; and removing the residue pattern exposed through the photo-resist pattern. The step of forming the photo-resist pattern may include coating a photo-resist on the first conductive pattern; and forming the photo-resist pattern by rear-exposing the photo-resist. The residue pattern is a minute pattern having a line width equal to or less than a resolution level of the rear exposure, wherein the minute pattern line width is equal to or less than about 4 µm.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred exemplary embodiments of the present invention, examples of which are shown in the accompanying drawings.

Figure 1:
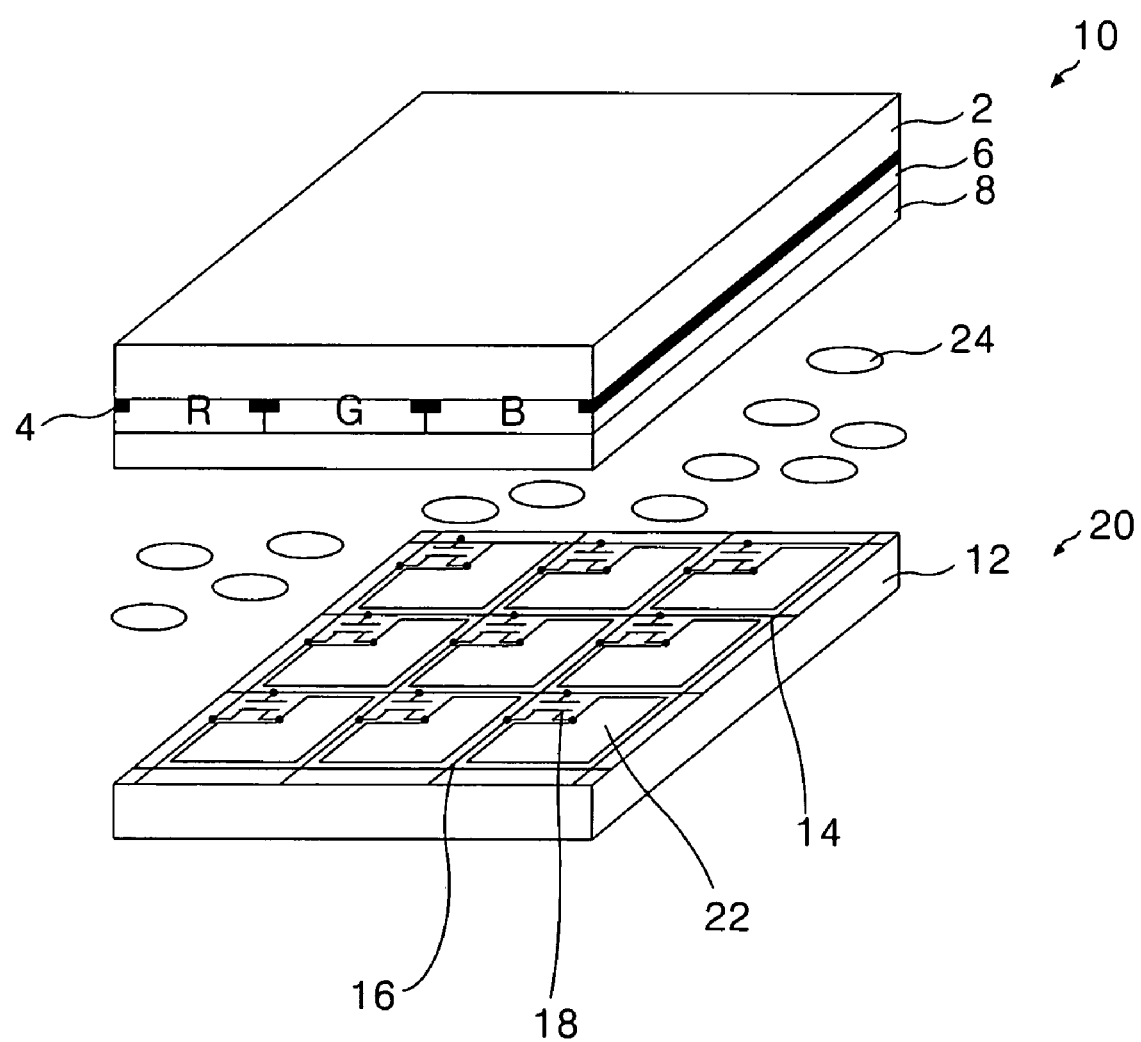
FIG. 1 is a perspective view of a liquid crystal display panel structure according to the related art.
Figure 2A:
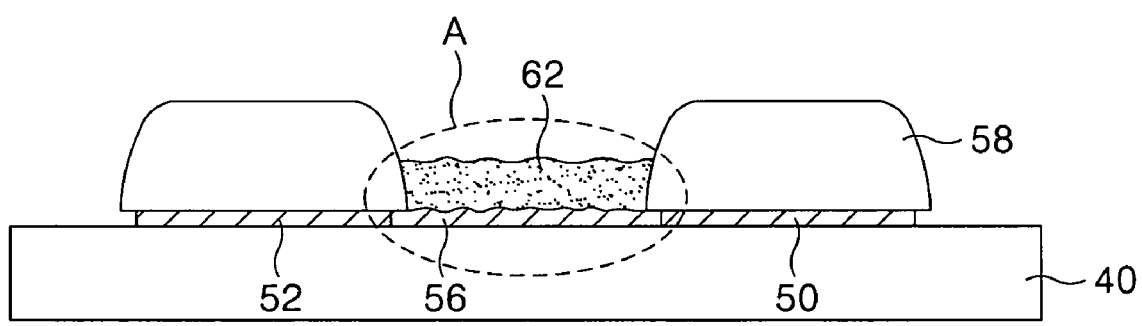
FIGS. 2A to 2C are cross sectional views of an exemplary short defect repairing method of a gate line and a common line of a liquid crystal display device according to a first embodiment of the present invention.
Figure 2B:
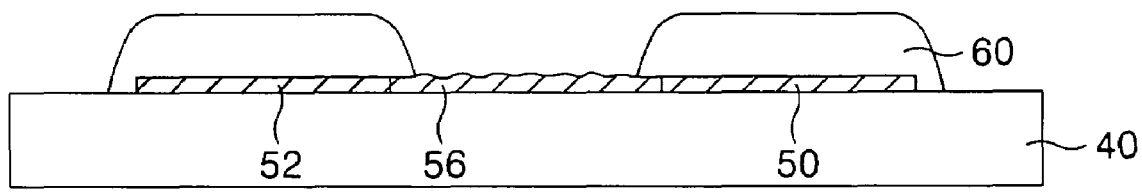
Figure 2C:
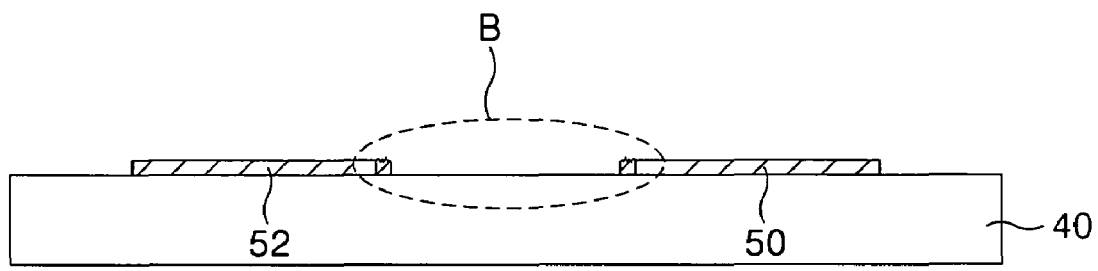
Figure 3A:
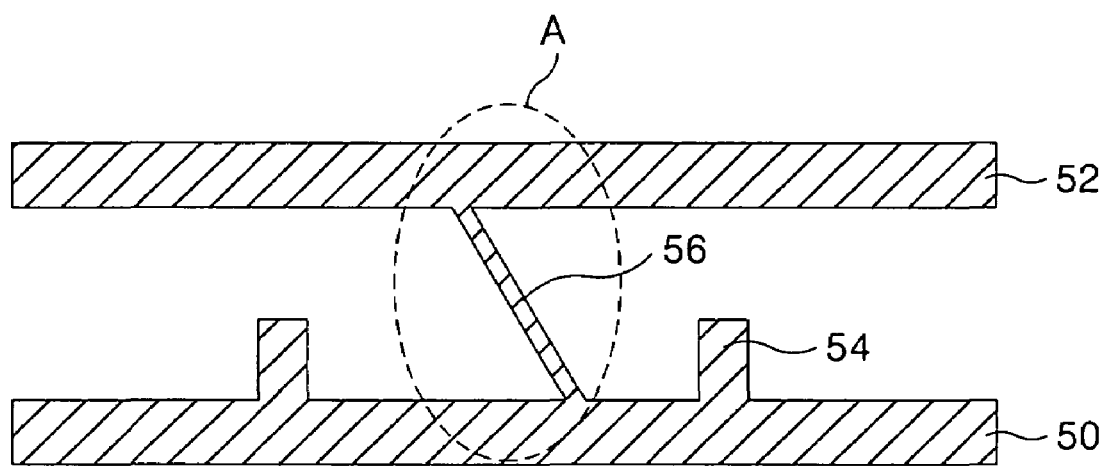
FIGS. 3A to 3C are plan views of the short defect repairing method of the gate line and the common line of the liquid crystal display device according to the first embodiment of the present invention.
Figure 3B:
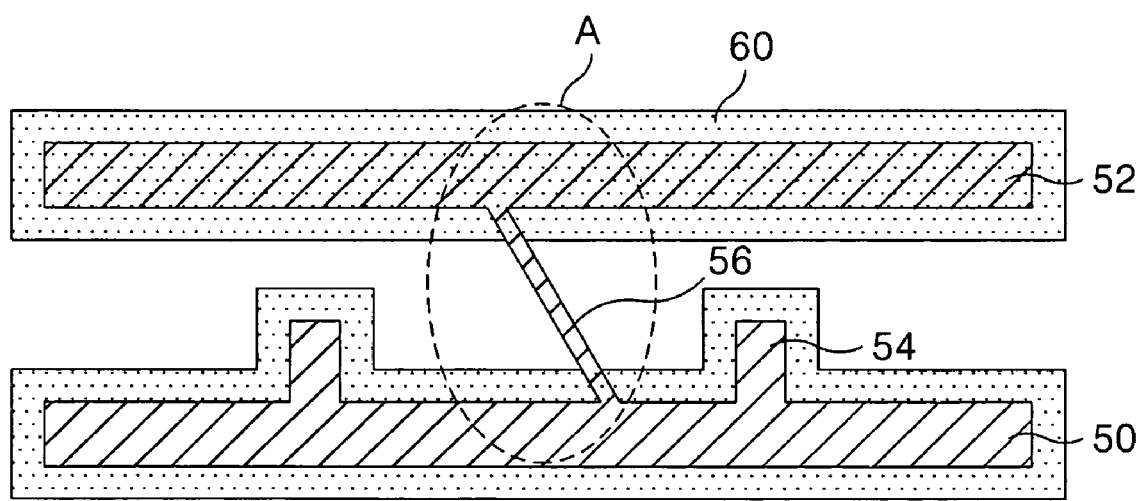
Figure 3C:
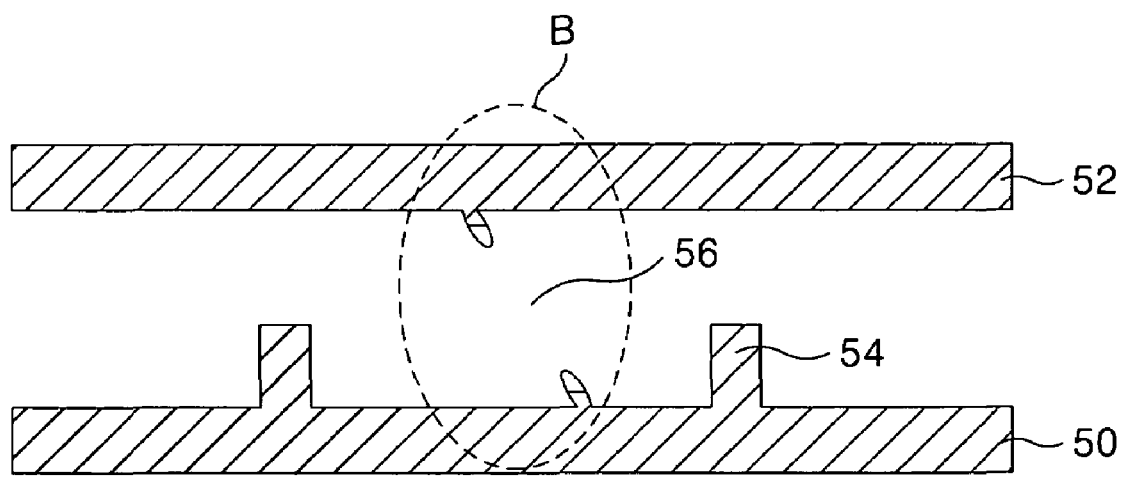

FIGS. 2A to 2C are cross sectional views of a short defect repairing method of a gate line and a common line of a liquid crystal display device according to a first embodiment of the present invention, and FIGS. 3A to 3C are plan views of the short defect repairing method of the gate line and the common line of the liquid crystal display device according to the first embodiment of the present invention. Referring to FIGS. 2A and 3A, a gate conductive pattern group may include a gate line 50, a common line 52, and a gate electrode 54 connected to the gate line 50, formed on a substrate 40 by a first mask process. The gate conductive pattern group is formed by depositing a gate metal layer on the substrate and etching the gate metal layer by establishing a first photo-resist pattern 58 formed by a photolithography process using a first mask. When there are impurities 62, such as particles, etc., in the gaps of a photo-resist pattern, as shown in FIG. 2A, the gate metal layer is not etched but remains in a shape of a residue pattern 56. In FIG. 3A, the residue pattern 56 may generate a defect in portion "A" where the adjacent gate line 50 and common line 52 are shorted.

FIGS. 2B and 3B show the residue pattern 56 removed by a separate mask process. FIGS. 2C and 3C show the repaired short defect between the gate line 50 and the common line 52. A second photo-resist pattern 60 is formed by the photolithography process using a second mask on the substrate 40 where the residue pattern 56 remains together with the gate conductive pattern, thereby only exposing the residue pattern 56. The residue pattern 56 is removed by an etching process using the second photo-resist pattern 60. In FIG. 3B, the second photo-resist pattern 60 is formed to encompass the gate conductive pattern, thereby protecting the gate conductive pattern from being damaged by the etching process. Because the residue pattern 56 is etched by the separate mask process, the short defect of the gate line 50 and the common line 52 may be repaired as in portion "B" as shown in FIGS. 2C and 3C. Furthermore, the second photo-resist pattern 60 is removed by a stripping process. Therefore, the short defect repairing method according to the present invention may repair the short defect between the gate line 50 and the common line 52 by removing the residue pattern 56 through the additional separate mask process.

Figure 4A:
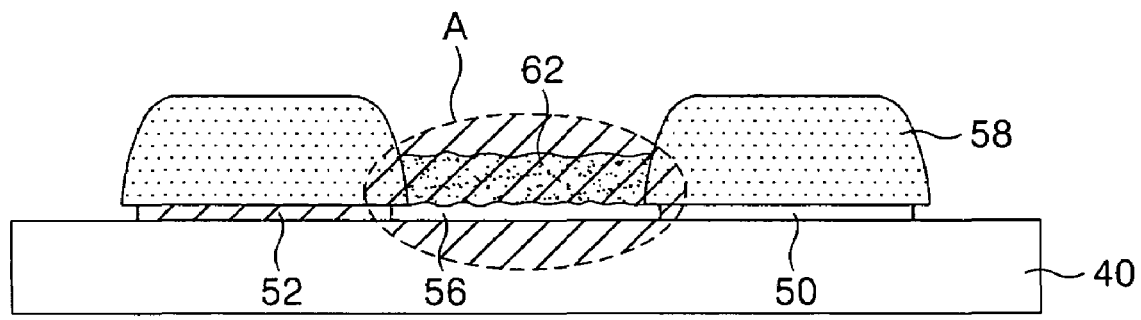
FIGS. 4A to 4D are cross sectional views of the short defect repairing method of a gate line and a common line of a liquid crystal display device according to a second embodiment of the present invention.
Figure 4B:
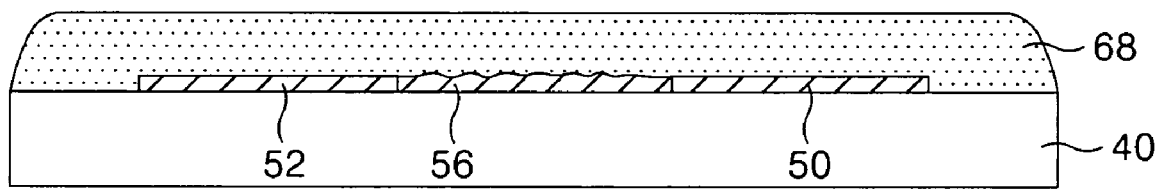
Figure 4C:
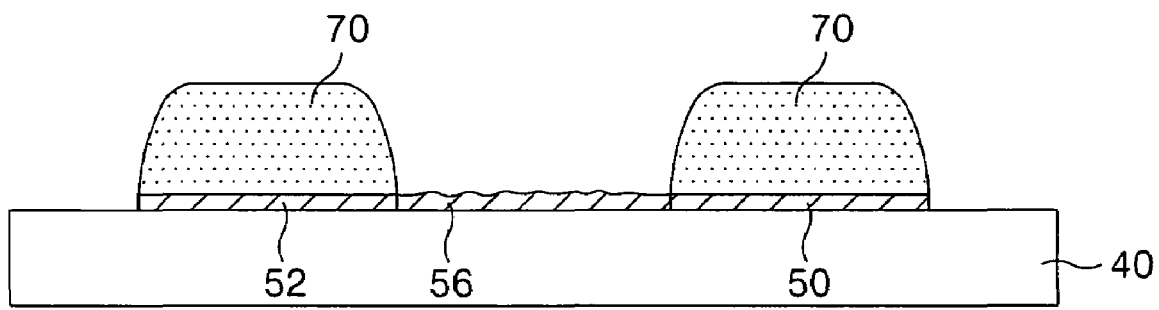
Figure 4D:
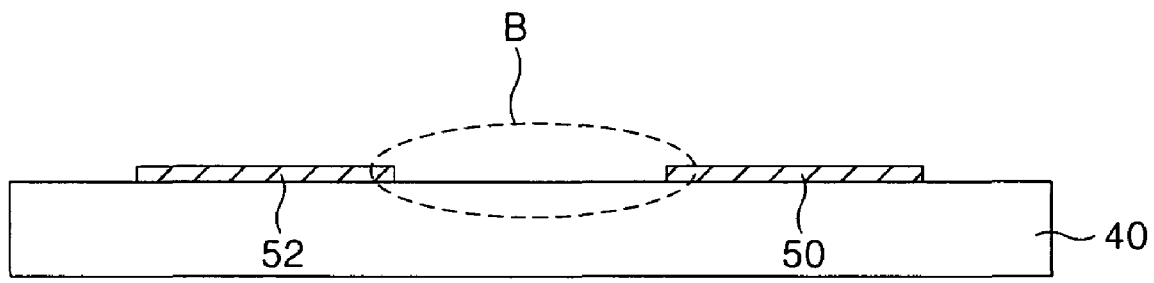
Figure 5A:
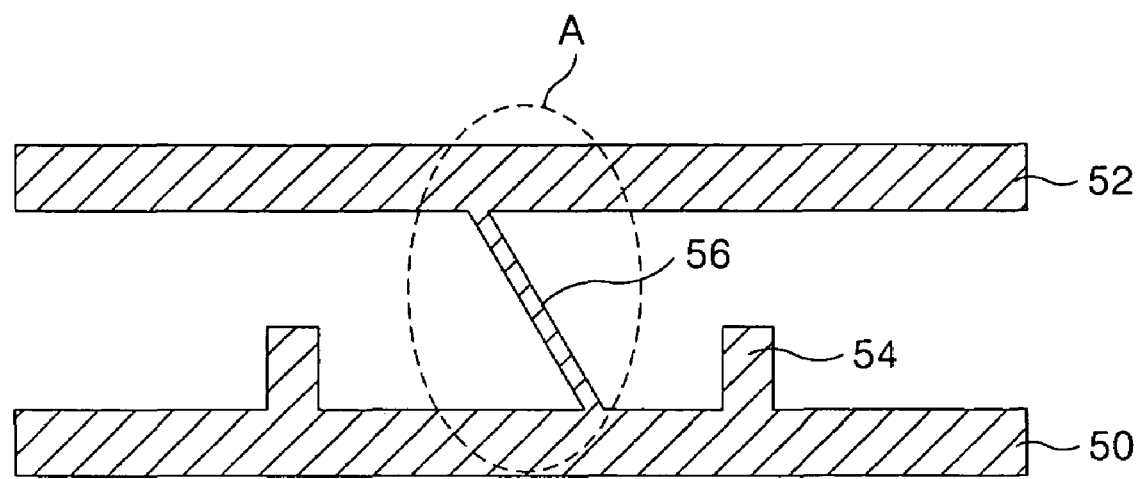
FIGS. 5A to 5C are plan views of the short defect repairing method of the gate line and the common line of the liquid crystal display device according to the second embodiment of the present invention.
Figure 5B:
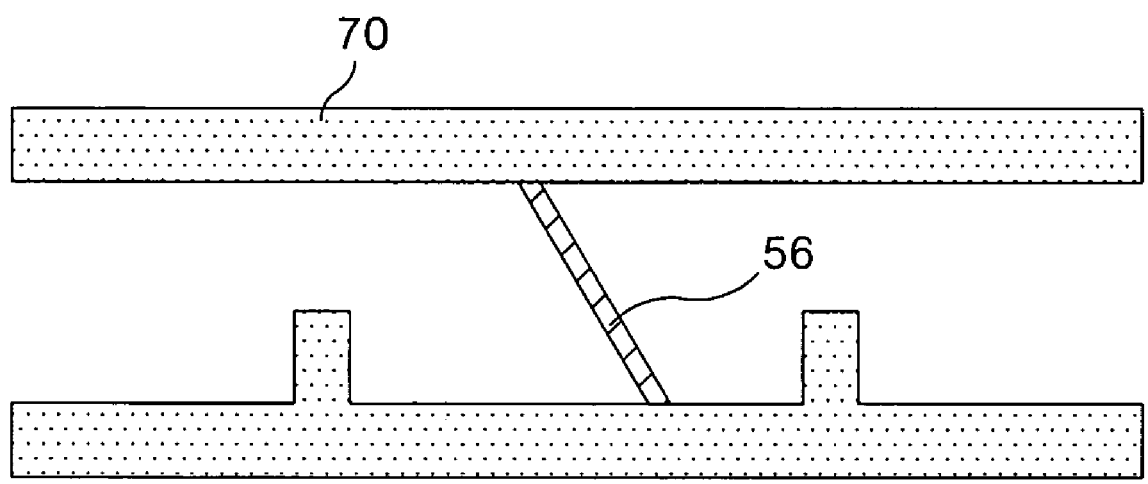
Figure 5C:
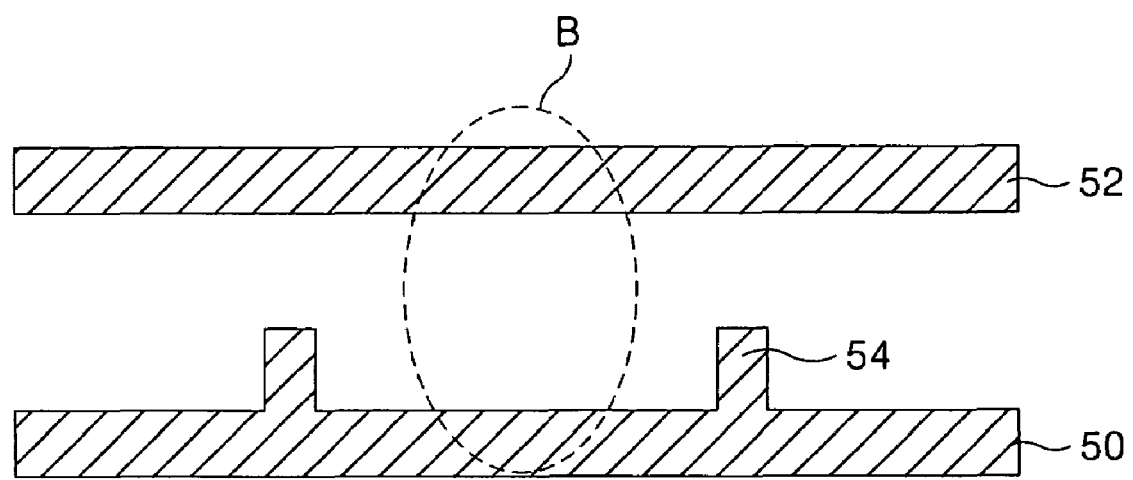

FIGS. 4A to 4D and FIGS. 5A to 5C show a short defect repairing method that removes a residue pattern without a separate mask process. FIGS. 4A to 4D are cross sectional views of a short defect repairing method of a gate line and a common line of a liquid crystal display device according to a second embodiment of the present invention, and FIGS. 5A to 5C are plan views of the short defect repairing method of the gate line and the common line of the liquid crystal display device according to the second embodiment of the present invention. FIGS. 4A and 5A may include a gate conductive pattern group inclusive of a gate line 50, a common line 52, and a gate electrode 54. The gate electrode 54 is connected to the gate line 50 and is formed on a substrate 40 by a first mask process. The gate conductive pattern group is formed by depositing a gate metal layer on the substrate 40 and etching the gate metal layer by establishing a first photo-resist pattern 58 formed by a photolithography process using a first mask. As shown in FIG. 4A, when there are impurities 62, such as particles, etc., in the gaps of a photo-resist pattern, the underlying gate metal layer is not etched but remains in a shape of a residue pattern 56. In FIG. 5A, the residue pattern 56 can cause to generate a defect in portion "A" where the adjacent gate line 50 and common line 52 are shorted.

In FIGS. 4B to 4D and FIGS. 5B to 5C, the residue pattern 56 may be removed by etching process because a photo-resist pattern 70 is formed on the gate conductive pattern with a rear exposure. More specifically, the photo-resist 68 is coated on the substrate 40, wherein the residue pattern 56 remains together with the gate conductive pattern as shown in FIG. 4B. The photo-resist 68 is exposed with a rear exposure and is developed with a development process, thereby forming the second photo-resist pattern 70 which is overlapped along the gate conductive pattern. Further, the gate conductive pattern acts as a mask upon the rear exposure to block ultraviolet light from a rear surface. Most of the residue pattern 56 caused by the impurities is so minute that there exists a line width of not greater than an exposure resolution level of about 4 µm. The second photo-resist pattern may not be formed on the residue pattern 56 since the residue pattern 56 does not act as a mask. Accordingly, the residue pattern 56 is removed by the etching process using the second photo-resist pattern 70. Furthermore, it is possible to repair the short defect of the gate line 50 and the common line 52 as shown in portion "B" of FIGS. 4D and 5C. Additionally, the second photo-resist pattern 70 is removed by a stripping process. Therefore, the short defect repairing method according to the present invention may repair the short defect between the gate line 50 and the common line 52 by removing the residue pattern 56 after forming the photo-resist pattern by the rear exposure not requiring the separate mask. Accordingly, the manufacturing cost may be reduced due to low cost rear exposure equipment that does not require an alignment, and productivity may be improved as well since the short defect repairing method is simplified.

Figure 6:
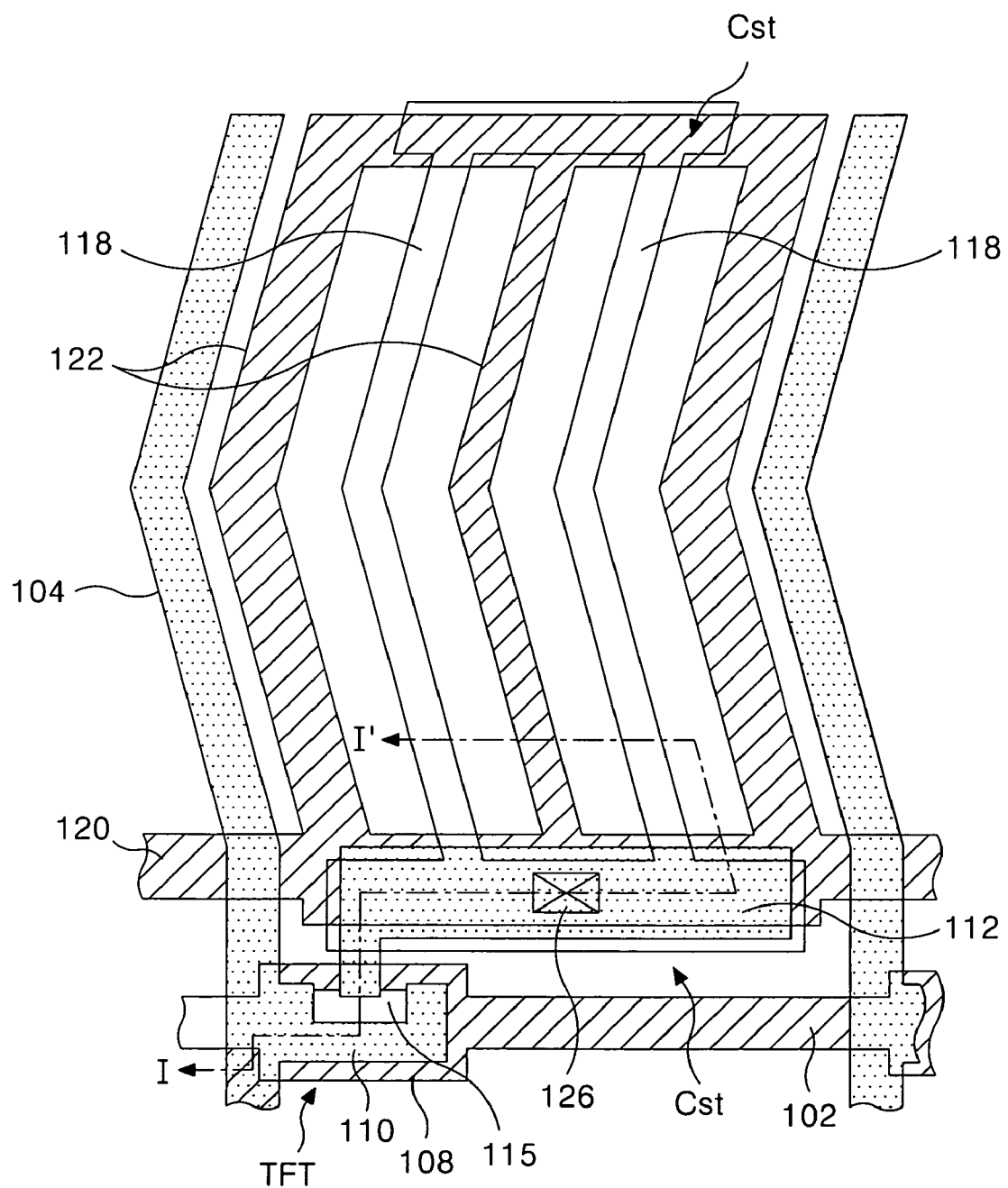
FIG. 6 is a plan view of a thin film transistor substrate of a horizontal electric field liquid crystal display device or In-Plane Switching mode liquid crystal display device to which the short defect repairing method is applied according to the second embodiment of the present invention.
Figure 7:
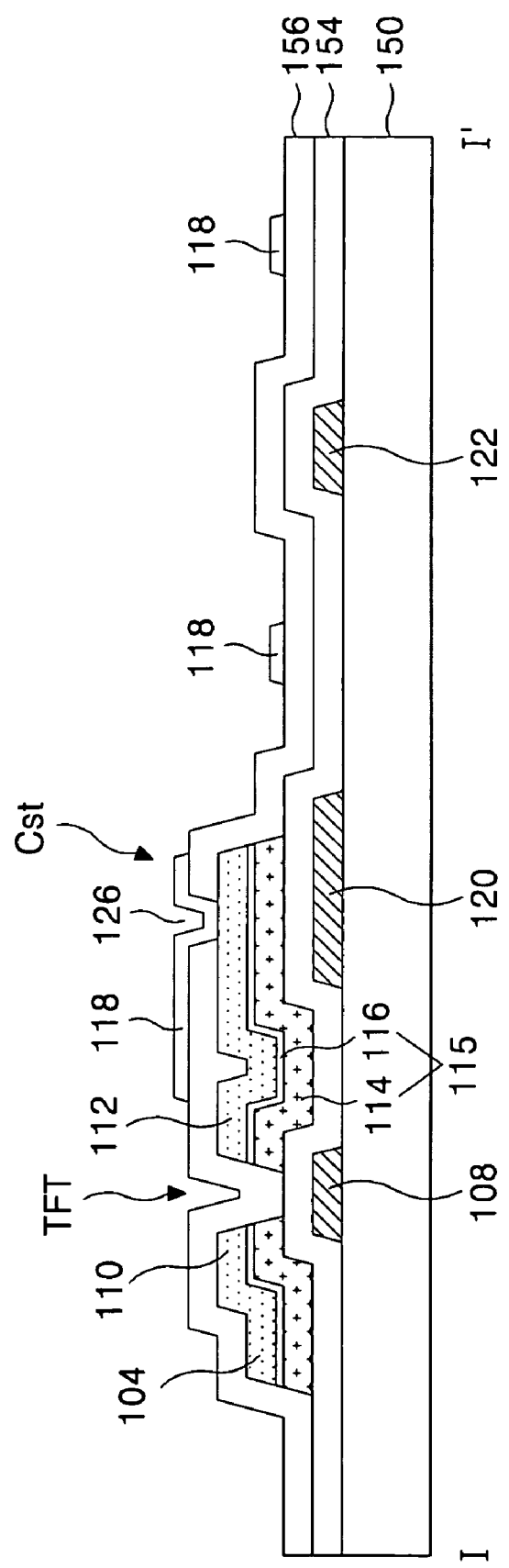
FIG. 7 is a cross sectional view along I-I' of FIG. 6 according to the present invention.

The short defect repairing method of the present invention may be applied to a fabricating method of the liquid crystal display device including a horizontal electric field liquid crystal display device or In-Plane Switching mode liquid crystal display device. FIG. 6 is a plan view of a thin film transistor substrate of a horizontal electric field liquid crystal display device or In-Plane Switching mode liquid crystal display device to which the short defect repairing method is applied according to the present invention, and FIG. 7 is a cross sectional view along I-I' of FIG. 6 according to the present invention. FIGS. 6 and 7 show a thin film transistor substrate that may include a gate line 102 and a data line 104 which cross each other with a gate insulating film 154 on a lower substrate 150, thereby defining a pixel area; a thin film transistor TFT connected to the gate line 102, the data line 104, and a pixel electrode 118; a pixel electrode 118 and a common electrode 122 for forming a horizontal electric field in the pixel area; a common line 120 connected to the common electrode 122; and a storage capacitor $C_{st}$ connected to the pixel electrode 118.

In FIGS. 6 and 7, the gate line 102 supplies a scan signal from a gate driver (not shown) and the data line 104 supplies a video signal from a data driver (not shown). The gate line 102 and the data line 104 cross each other with a gate insulating film 154 to define each pixel area. Further, FIG. 6 shows the common line 120 supplying a reference voltage, i.e., a common voltage, to each pixel through a common electrode 122 for driving the liquid crystal. The common electrode 122 has a finger part and a horizontal part. The finger part of the common electrode 122 projects from the common line 120 into the pixel area and is parallel to the finger part of the pixel electrode 118, while the horizontal part is commonly connected with the finger part. The common electrode 122 and the pixel electrode 118 are formed in a zigzag pattern together with the data line 104. Additionally, FIG. 6 shows that the common electrode 122 and pixel electrode 118 may be formed in a straight line pattern alongside the data line 104, and may be formed in various patterns other than the straight line. Furthermore, the common electrode 122 and the pixel electrode 118 are formed in a zigzag pattern and the data line 104 may be formed in the straight line.

In FIGS. 6 and 7, the thin film transistor TFT makes the video signal on the data line 104 charged and maintained in the pixel electrode 118 in response to the scan signal of the gate line 102. The thin film transistor TFT includes a gate electrode 108 connected to the gate line 102; a source electrode 110 connected to the data line 104; a drain electrode 112 which faces the source electrode and is connected to the pixel electrode 118; an active layer 114 which is overlapped with the gate electrode 108 with the gate insulating film 154; and an ohmic contact layer 116 for being in ohmic contact with the active layer 114 and the source and drain electrodes 110 and 112. A semiconductor layer may include the active layer 114 and the ohmic contact layer 116 is overlapped with the data line 104.

Additionally, FIGS. 6 and 7 show that the pixel electrode 118 may include a finger part which is parallel to the finger part of the common electrode 122, a first horizontal part which is connected with the finger part and is overlapped with the drain electrode 112, and a second horizontal part overlapped with the horizontal part of the common electrode 122. The first horizontal part of the pixel electrode 118 is connected to the drain electrode 112 through a contact hole 126 that penetrates a passivation film 156. If a video signal is supplied to the pixel electrode 118 through the thin film transistor TFT, a horizontal electric field is formed between the finger part of the pixel electrode 118 and the finger part of the common electrode 122 to which the common voltage is supplied. The liquid crystal molecules arranged in a horizontal direction between the thin film transistor substrate and the color filter substrate rotate by dielectric anisotropy as a result of the horizontal electric field. The transmittance of light penetrating the pixel area is changed in accordance with the degree of rotation of the liquid crystal molecules, and hence, a gray level is achieved. A storage capacitor $C_{st}$ is formed to overlap the common line 120 and the drain electrode 112 with the gate insulating film 154 and the semiconductor pattern 115. The storage capacitor $C_{st}$ stably maintains the charge in the video signal in the pixel electrode 118.

Hereinafter, the method of fabricating the thin film transistor substrate having the construction as shown in FIG. 6 is described with reference to FIG. 7. A first conductive pattern group which may include a gate line 102, a gate electrode 108, a common line 120, and a common electrode 122, is formed by patterning after forming a first conductive layer on the substrate 150. In the event that the adjacent gate line 102 and common line 120 are shorted due to a minute residue pattern of exposure resolution level, only the residue pattern can be etched away by forming the photo-resist pattern by a rear exposure. The semiconductor layer and the second conductive layer are patterned after depositing the gate insulating film 154, the semiconductor layer and the second conductive layer. Therefore, a semiconductor pattern 115 is formed that may include the active layer 114 and the ohmic contact layer 116, as well as a second conductive pattern group that may include a data line 104, a source electrode 110, and the drain electrode 112 which overlap the semiconductor pattern 115. As a result, the semiconductor pattern 115 and the second conductive pattern group may be formed by a separate mask process.

Furthermore, in FIG. 7 the passivation film 156 is formed and patterned, thereby forming the contact hole 126. Then, a transparent conductive layer (not shown) is formed on the passivation film 156 to be patterned, thereby forming the pixel electrode 118. The common electrode 122 may be formed of the transparent conductive layer on the passivation film 156 together with the pixel electrode 118. As shown in FIG. 7, the common electrode 122 is connected to the common line 120 through the contact hole 126 which penetrates the passivation film 156 and the gate insulating film 154.

While the concepts presented heretofore have been presented in the context of a horizontal electric field liquid crystal display device or In-Plane Switching mode liquid crystal display device, it should be noted that it is not necessary limited to it. It can also be employed in connection with any liquid crystal display device to which any driving mode such as Twisted Nematic TN mode or Vertical Alignment VA mode is applied.

The short defect repairing method and the fabricating method of the liquid crystal display device according to the present invention removes the residue pattern exposed by forming the photo-resist pattern by a rear exposure, thereby making it possible to repair the short defect. Therefore, the simplified process improves productivity since a separate mask is not required, and the manufacturing cost may be reduced due to low cost rear exposure equipment.

It will be apparent to those skilled in the art that various modifications and variations may be made in the method of repairing a short defect in a liquid crystal display device as well as the method of fabricating the liquid crystal display in the present invention without departing from the spirit or scope of the inventions. Thus, it is intended that the present invention covers the modifications and variations of this invention provided they come within the scope of the appended claims and their equivalents.

What is claimed is:

1. A method for repairing a short defect for a liquid crystal display device, comprising:
   forming a first conductive pattern on a substrate;
   forming a photo-resist pattern on the first conductive pattern using a rear exposure for the first conductive pattern being shorted by a residue pattern, wherein the residue pattern has a line width equal to or less than a resolution level of the rear exposure; and
   removing the residue pattern exposed through the photo-resist pattern.

2. The method according to claim 1, wherein forming the photo-resist pattern includes:
   coating a photo-resist on the first conductive pattern; and
   forming the photo-resist pattern by rear-exposing the photo-resist.

3. A method of fabricating a liquid crystal display device, comprising:
   forming a gate line and a common line on a substrate;
   forming a photo-resist pattern on the gate line and the common line using a rear exposure for the gate line and the common line being shorted by a residue pattern, wherein the residue pattern has a line width not greater than a resolution level of the rear exposure; and
   removing the residue pattern exposed through the photo-resist pattern.

4. The method according to claim 3, wherein forming the photo-resist pattern includes:
   forming a photo-resist on a substrate where the gate line and the common line are formed; and
   forming the photo-resist pattern by the rear exposure using the gate line and the common line as a mask.

5. The method according to claim 3, wherein the residue pattern has a line width equal to or less than about 4 µm.

* * * * *